(No Model.)  4 Sheets—Sheet 1.

F. H. RICHARDS.
WEIGHING MACHINE.

No. 585,969.  Patented July 6, 1897.

Witnesses
Chas. F. Schmelz
Fred. J. Dole.

Inventor
F. H. Richards (No Model.) 4 Sheets—Sheet 2.

F. H. RICHARDS.
WEIGHING MACHINE.

No. 585,969. Patented July 6, 1897.

Witnesses
Chas. F. Schmelz.
Fred. J. Dole.

Inventor.
F. H. Richards.

(No Model.) 4 Sheets—Sheet 3.

F. H. RICHARDS.
WEIGHING MACHINE.

No. 585,969. Patented July 6, 1897.

Witnesses
Chas. R. Schmelz
Fred. J. Dole.

Inventor
F. H. Richards.

(No Model.)　　　　　F. H. RICHARDS.　　　4 Sheets—Sheet 4.
WEIGHING MACHINE.

No. 585,969.　　　　　　　　　Patented July 6, 1897.

Witnesses
Chas. F. Schmelz
Fred. J. Dole.

Inventor
F. H. Richards.

United States Patent Office.

FRANCIS H. RICHARDS, OF HARTFORD, CONNECTICUT.

WEIGHING-MACHINE.

SPECIFICATION forming part of Letters Patent No. 585,969, dated July 6, 1897.

Application filed November 21, 1896. Serial No. 613,009. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of granular and other free-flowing substances.

With respect to one of its features the invention comprehends the provision, in connection with a load-receiver and with stream-supplying means therefor, of a preferably inclined stream-receiving plate carried by the bucket, which plate is so located as to receive the force of impact of a gravitating supply-stream flowing toward the bucket, whereby such force is much reduced and is rendered practically uniform, so that one of the serious load-vitiating factors is materially modified and the accuracy of the machine is consequently enhanced.

In the construction illustrated I mount a spout on the bucket, it consisting of a series of superposed stream-receiving plates, two of such plates being represented, one of which is intended to receive a main stream, while the other receives the drip-stream, and said plates also deliver or direct the respective streams to the load-receiver or bucket.

Another object of the invention is to furnish an improved organization of beam mechanism consisting of a series of bucket carrying or sustaining beams and an independently-mounted weight-carrying beam, the component members of the first-mentioned beam system being so disposed relatively to each other as to exert equal amounts of leverage and to receive at substantially equidistant points the load applied thereto by the bucket and its contents, whereby a more efficient action of the weighing mechanism as a whole, as it reciprocates during the weighing operation, is obtained.

Figure 1:
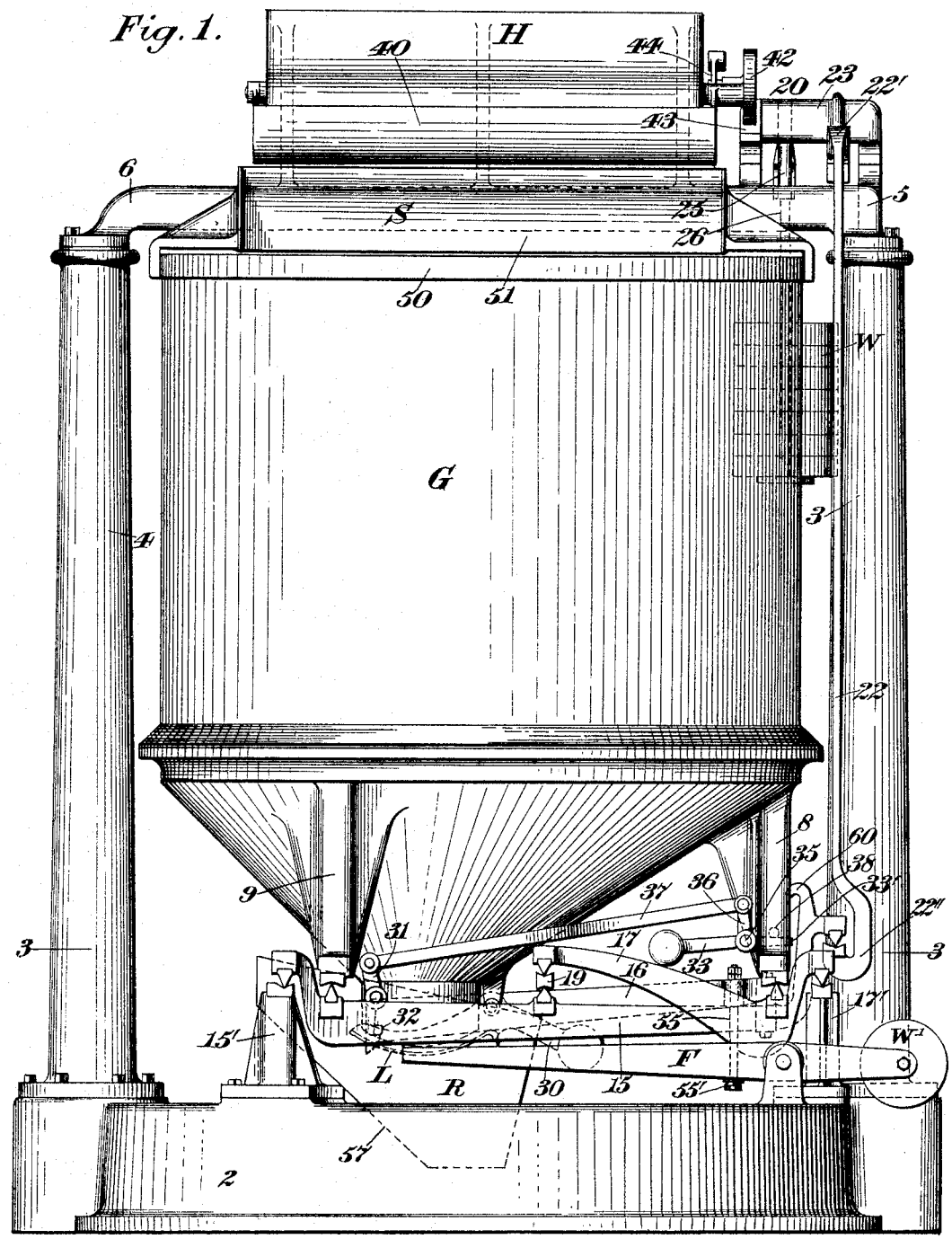
Figure 2:
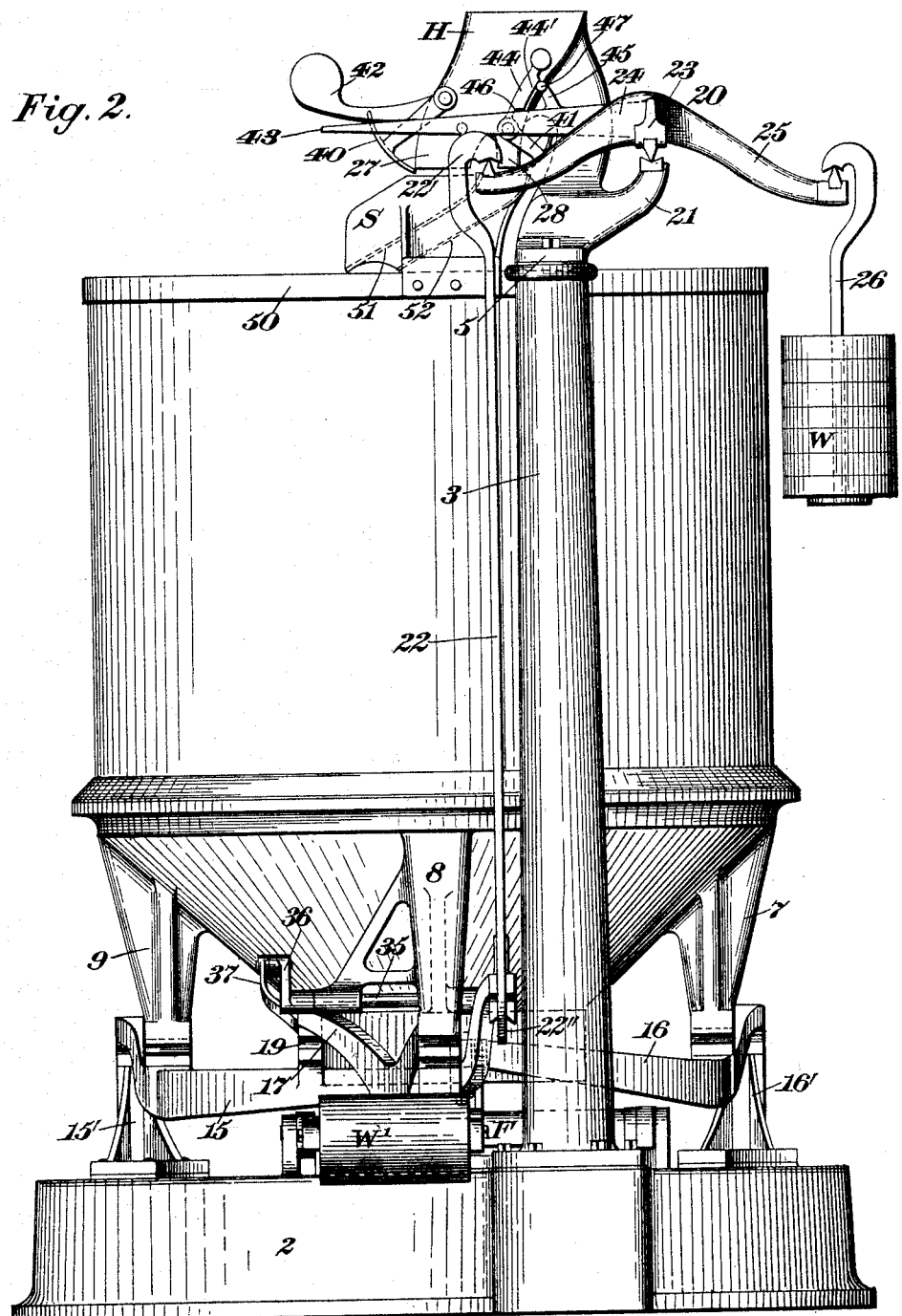
Figure 3:
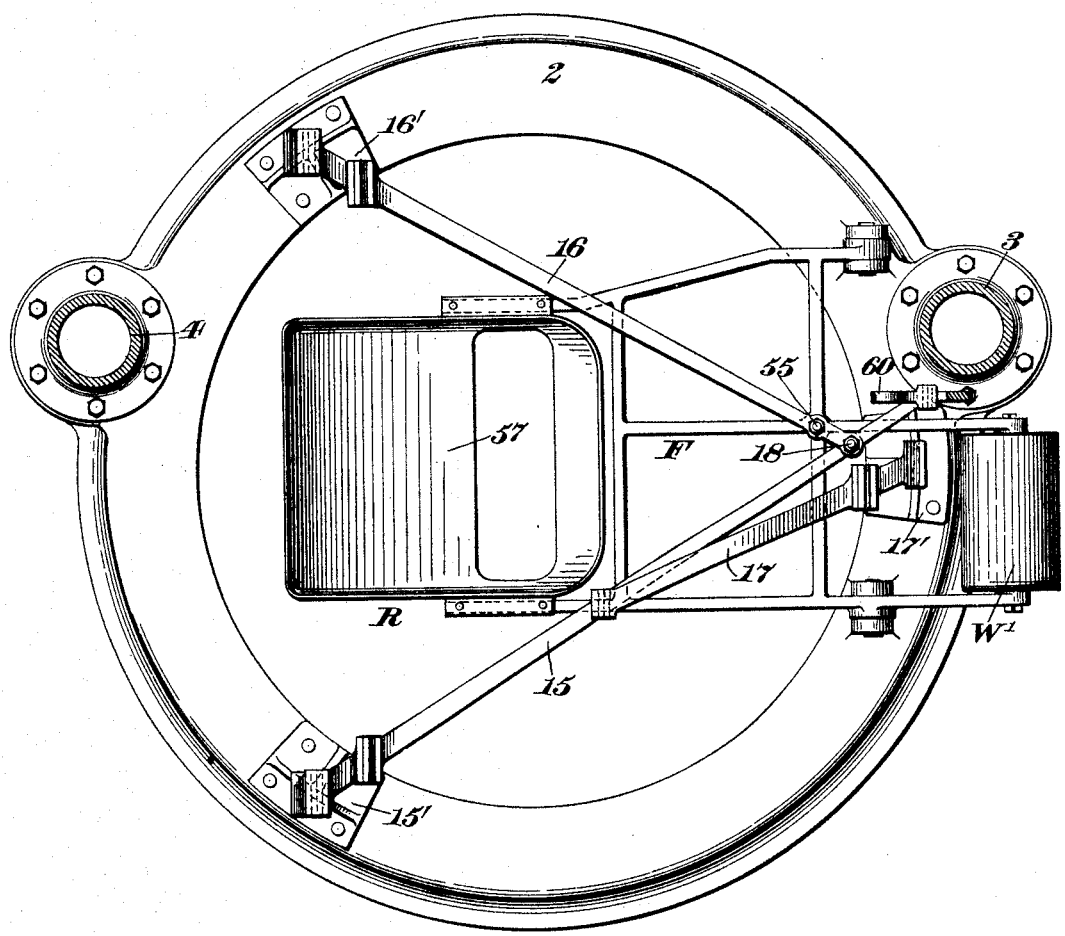
Figure 4:
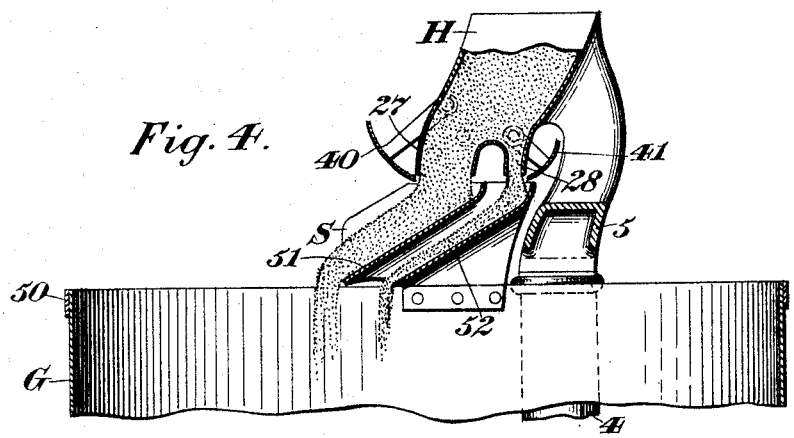
Figure 5:
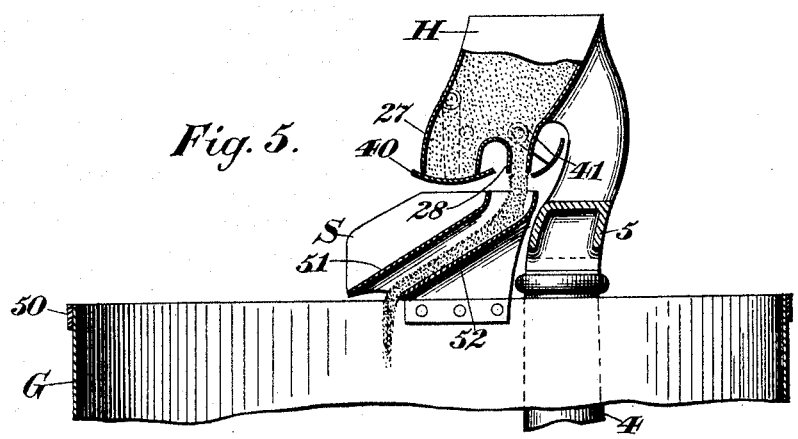
Figure 6:
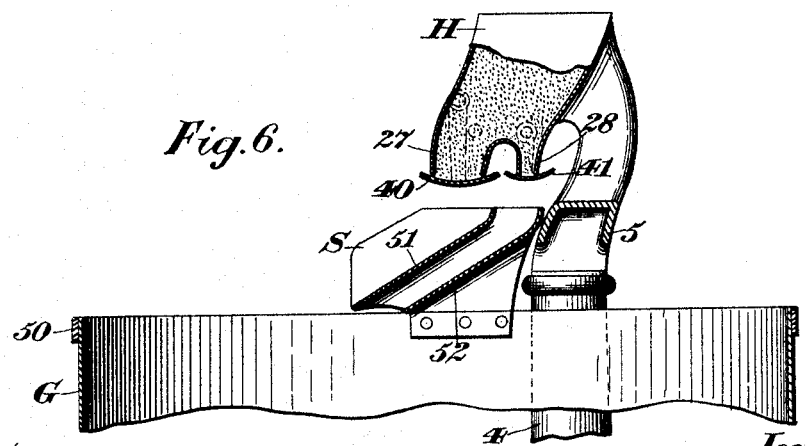

In the drawings accompanying and forming part of this specification, Figure 1 is a front elevation of a weighing-machine embodying my present improvements, and it illustrates the positions occupied by the respective parts at the commencement of operation. Fig. 2 is an end elevation of the machine as seen from the right in Fig. 1. Fig. 3 is a sectional plan view, the section being taken on the line 3 3, Fig. 1, with the bucket removed. Fig. 4 is a detail with portions in central vertical section, and it illustrates the supply apparatus and a fragment of the bucket, the supply-regulating valves both being in their wide-open positions; and Figs. 5 and 6 are similar views illustrating the positions occupied by the valves at the commencement of the poising period and at the close of the weighing operation, respectively.

Similar characters designate like parts in all the figures of the drawings.

The framework for carrying the operative parts of the machine or mechanism may be of any suitable character, and in the present instance it consists of the circular supporting base or bed 2 and the longitudinal cylindrical columns or standards 3 and 4, said columns being bolted or otherwise secured to the base and being surmounted by the supply chute or hopper H, which has oppositely-extending brackets 5 and 6 attached to said columns.

The weighing mechanism consists of a load-receiver or bucket and supporting beam mechanism therefor, which operate in the usual manner, said load-receiver being designated by G and having its inlet-opening located below and adjacent to the discharge-orifice of the supply-hopper H.

The bucket, which is intended for weighing and delivering relatively large lots of material, is mainly cylindrical in shape, its wall near the lower part thereof sloping toward the usual discharge-outlet to permit the ready gravitation therefrom of the load, and the reduced portion of the bucket will be furnished with a series of depending brackets 7, 8, and 9, which are equidistantly disposed and which are equipped at their lower ends with notched bearings resting upon knife-edge pivots on the beam mechanism.

The beam mechanism in the form shown consists of two beam systems, one of which comprises a plurality of bucket carrying and balancing beams, while the other consists of an independently-mounted weight-carrying beam furnished with a series of removable load-weights, by which any given quantity of material may be weighed out in the bucket.

The bucket-carrying beam system in the form shown comprehends a series of coöperating non-counterweighted unalined beams or levers, which are designated by 15, 16, and 17, they being fulcrumed upon the brackets 15', 16', and 17', secured at regular intervals to the upper face of the base or bed 2, the respective beams being furnished with knife-edge pivots which rest in notched bearings carried by the several brackets. The three beams will have a series of properly-spaced bucket-supports triangularly disposed thereon, such supports consisting of the well-known knife-edges which sustain the notched bearings of the depending brackets 7, 8, and 9.

The beam 16 will be connected to the beam 15 for synchronous coaction, the headed pin or bolt 18 being provided for attaining this result, it joining the end of the beam 16 to the beam 15 at a point near one of the extremities of the latter.

A bearing-block is illustrated at 19 situated between the beams 15 and 17, such bearing-block being of double-notched formation, in the notches of which are located or lie pivots or knife-edges on the two beams 15 and 17, whereby the opposite oscillations of the two beams during the reciprocations of the bucket may be properly compensated for, the several beams by reason of their junctures with one another also exerting their respective forces one upon the other during the weighing and return movements of the bucket.

The weight-carrying beam, which is supported independently of the bucket-carrying beams, is designated by 20, it being provided at about midway its length with a knife-edge pivot, which is supported by a V-shaped bearing on the arm 21, which extends rearward from the chute-bracket 5, said weight-carrying beam being suitably operatively connected to the bucket-carrying beam mechanism, such as by the interposed relatively long double-hooked rod 22, whereby by means of said beam 20 loads of various quantities can be weighed when desired.

The scale-beam 20 is made up of a transverse bar or member 23 and a pair of oppositely-disposed arms 24 and 25, the movement of the first-mentioned arm coinciding with that of the bucket.

The arm 24 will be furnished at its extreme outer end with a knife-edge pivot, the beam 15 being similarly equipped, and these two members will be connected by the relatively long rod 22, to which I have previously alluded and which has at its opposite ends the hooks 22' and 22", which have notched working faces bearing against the said beam knife-edges.

The rearwardly-extending beam-arm 25 has suspended therefrom the rod 26, the connections between these two parts being by a knife-edge and notched bearings, said rod having at its lower end a supporting-plate for sustaining a series of removable load-weights of ordinary construction and which are designated in a general way by W, and which may be applied to or taken from the rod 26 in the usual manner.

The supply chute or hopper H, which is adapted for containing the mass of material to be weighed for delivery toward the bucket, is of the "duplex" kind, it having two spouts 27 and 28, the first-mentioned of which is for the passage of the main stream, while the other is intended for the drip-stream. These two streams flow into the bucket simultaneously for a certain period of time or up to the poising period, at which point the supply of the main or large stream is stopped, the load at this time being nearly completed. The drip-stream will then be supplied to the bucket for a limited period of time for finishing or topping off the partial load delivered by the two streams conjointly. The two streams will be preferably regulated by stream-controllers actuated or governed by means coöperative with the weighing mechanism to insure the obtainment of proper loads.

The bucket G will have the usual discharge-outlet, the closer L being provided therefor and it being pivoted at one side of said outlet.

The closer consists of a concaved plate which fits against the convex lower portion of the bucket surrounding the outlet thereof and is provided with a rearwardly-extending counterweighted arm 30, the function of the latter being to return the closer to its shut position on the discharge of a bucket-load.

For holding the closer shut I may employ a latch or detent device, such as 31, which is pivotally connected to the bucket and which has a hook located to engage the coöperating fixed stud 32 on one end of the closer, as represented by Fig. 1, said latch being preferably perpendicularly disposed to facilitate its closer-restraining action.

The latch 31 will be swung outward to disengage it from the coöperating stud 32 of the closer, and when this action takes place the latter will be freed of all restraint and can then be forced open by the weight of the load within the bucket as it gravitates therefrom.

The actuator for the closer-latch 31 consists of a counterweighted lever 33, the hub of which is suitably attached to the rock-shaft 35, carried by the hanger 8, said shaft being operatively connected to said latch. Said shaft 35 is provided at its outer end with the crank-arm 36, which is connected by the link 37 to the upper arm of the closer-latch 31. (See Fig. 1.) The non-counterweighted member or arm of the latch-actuator 33 is disposed in the path of movement of a suitable tripping device, which is preferably operative with the beam mechanism, so that when said arm has depressed the rock-arm 33' the link 37 and the upper arm of the latch will be simultaneously swung to the right, thereby oppositely oscillating the detent-arm of the latch and disengaging it from the stud 32 on the closer. On the return stroke of the tripping device the respective parts just described, including the latch 31, will be caused to resume their normal positions by the dropping of the weighted arm of the latch-actuating lever 33, whereby the latch may again exercise its effective function. On the return of the said parts to their primary positions the free arm 33' of the latch-actuating lever 33 will abut against the stop or pin 38 on the hanger 8, which limits its effective action.

The means employed for controlling the supply of material to the bucket consist of a pair of successively-operative stream-controllers or valves, one of which, or the main valve, which is designated by 40, regulates the main stream which flows from the main spout 27, while the other or drip valve arrests the supply of the drip-stream to the bucket at the proper stage, the main valve closing first or when the major part of the load has been received by the bucket, and said drip-valve being maintained in its wide-open position while the main valve is closing, and it being held in such position up to the completion of the load, when it is promptly shut to cut off the drip-stream.

The two valves 40 and 41 consist of slightly-curved plates pivotally suspended for reciprocatory movement beneath the two outlets of the hopper H, their arms being provided with suitably-supported projecting pivots. The pivot for the main valve 40 is furnished with a counterweighted arm 42, constituting a suitable device for closing said valve, this action, however, being limited by means operative with the weighing mechanism, such as the rigid stop-arm 43, which extends forwardly from the load-carrying beam 20, and against the upper face of which the adjacent curved surface of the counterweighted arm is adapted to rest, so that as said rigid arm 43 descends with the beam 20 during the loading period and falls away from the valve-actuator 42 the valve 40 may be operated to effect the cut off of the stream from the main spout 27.

As the bucket and beam 20 rise, the rigid arm 43, acting against the counterweighted arm 42, will cause the valve 40 to again open to permit the main supply to pass into the bucket, it being evident that the rigid stop-arm 43 on the ascent of the bucket is in the nature of a main valve-opening actuator.

The auxiliary valve 41 will be furnished with an actuator 44, which is in the nature of a counterweighted arm fixedly attached to a projecting pivot or trunnion thereof and with which coöperates a retarding device or stop 45 on the arm 43.

The valve-actuating device 44 has adjacent to the stop-arm 45 the curved face 44', in which is formed the relatively deep notch 46, the purpose of which will be hereinafter set forth, said curved face being concentric with the axis of oscillation of the weight-carrying beam 20.

The stop-arm 45 on the beam is furnished with a lateral stud or pin 47, which as the beam descends will travel along and in contact with the curved face 44' of the valve-actuating arm 44 to thereby hold the valve in its open position. At the close of the weighing operation the pin 47 will have reached a point opposite the relatively deep notch 46, thus freeing the arm 44, so that it can drop quickly, and hence cause the drip-valve to close quickly for cutting off the drip-stream.

As the beam and bucket rise, the pin 47, which is operative with the beam acting against the curved wall of the notch 46, will push or thrust against the arm 44, thereby throwing it backward and thus forcing the valve open, and when it passes beyond such notch it will be contiguous to the curved face 44'.

The bucket G carries or supports a spout, that illustrated being designated by S and having oppositely-disposed extensions, the flanges of which are attached to the band or ring 50, which encircles or embraces the bucket at its supply-opening, rivets or other fastening devices passing through the said flanges, the ring 50, and the bucket G to hold said parts together.

The spout S is composed of a series of superimposed inclined stream-receiving plates preferably disposed in parallelism, and two of such plates are represented, they being designated by 51 and 52, respectively, and being intended to break the force of impact of the supply-stream after it emerges from the adjacent hopper H. The plate 51 is located to receive the main stream from the main spout 27 and the plate 52 is for the purpose of receiving the drip-supply from the auxiliary spout 28, and the amount of fall of the drip to the load-line in the bucket near the close of the weighing operation is so very slight as not to prevent the weighing of a correct load. The end walls of the spout S serve as guards to prevent lateral flow of the supply after it issues from the chute H and before it is delivered to the bucket G.

I provide in conjunction with the bucket a swinging regulator which is in the form of a hopper and which is situated to receive the loads of material as they are intermittingly discharged by the bucket, said hopper having a member or carrier operative therewith which is adapted on one of the strokes thereof to engage a coöperating stop of the weighing mechanism to prolong or retard the return of the bucket when it is discharging a load of material.

The regulator-hopper R is carried upon the rocking carrier or spider-frame F, the two outer arms of which are pivoted between suitable ears or lugs upon the upper face of the base or bed 2. The rocking frame F will also be furnished with a suitable counterbalance, as W', to the right of the axis of movement of the regulator-arms for returning the regulator to its primary position when the contents have been fully emptied therefrom.

An elongated bolt is represented at 55 passing through transverse apertures in the scale-beam 16 and the adjacent hopper carrier or frame F, the head 55' of said bolt constituting a stop which is engaged by the coöperating frame F on the depression of the regulator-hopper R, whereby the latter, acting through said frame F, will impede or prolong the return movement of the emptying bucket to allow ample time for it to completely empty and to also guard against the premature opening of the valve.

When the bucket reaches the limit of its downstroke on the completion of a load, the latch 31 will be tripped, as will hereinafter appear, and this action will release the closer, so that it may be instantly forced open by the weight of the contents within the bucket, which contents then pass into the hopper R and depress or force the same downward.

The discharge-orifice of the hopper R is of substantially the same area as the discharge-outlet of the bucket, which prevents the material from escaping from the hopper too rapidly, so that the latter will be maintained in its depressed position for a relatively long period of time, whereby the rocking frame F, which operates in unison therewith by engaging the stop 55', will prevent the rise of the empty bucket and hence the opening of the supply-valves.

When the mass is discharged from the bucket, it will be delivered against the inclined wall 57 of the hopper, so that the material while confined within the hopper can act against the closer L to keep it in its wide-open position to insure the complete discharge of the bucket-load.

The means for effecting the tripping of the latch is operative with the beam mechanism and consists of the trip device (designated by 60) in the form of a curved arm upon the beam 15, which at the close of the weighing operation will impinge against the arm 33' of the latch-actuating lever 33, forcing said arm downward and concurrently swinging the crank-arm 36, the link 37, and the upper arm of the latch 31 to the right, thereby throwing said latch into its ineffective position for disengaging it from the stud 32 of the closer L, whereby the latter can be forced open in the manner previously specified.

The operation of the hereinbefore-described weighing-machine is as follows: Fig. 2 represents the positions occupied by the respective parts at the commencement of operation, both valves 40 and 41 being wide open to permit the full supply to pass to the stream-receiving plates 51 and 52, from whence it drops into the bucket G. When a certain proportion of the load has been received, the beam mechanism, including the weight-carrying beam 20, will drop, and the rigid stop-arm 43 of the beam 20 will move away from the counterweighted arm 42 to permit the latter to close the valve 40 for cutting off the main stream from the spout 27. The valve 40 having been closed, as illustrated in Fig. 5, the drip-stream will flow into the bucket from the spout 28, and the beam 20, descending further, will carry the stop-pin 47 opposite the notch 46 of the counterweighted valve-actuating arm 44, so that the latter will be released and, dropping, will close the drip-valve 41, as indicated in Fig. 6, to cut off the drip-supply. The beam mechanism and the bucket having descended, the trip device 60 will be carried against the arm 33' of the lever 33, thereby throwing the latch 31 into its inoperative position and disconnecting it from the stud 32 of the closer L. The closer L will be then forced open by the weight of the contents in the bucket, and when they have been fully discharged said closer will be shut and the several parts will then be caused to return to their normal positions.

Having described my invention, I claim—

1. The combination, with weighing mechanism including a bucket, of a supply-hopper having two spouts for the delivery, respectively, of main and drip streams to the bucket; a pair of valves for controlling said streams; and inclined parallel main and auxiliary stream-receiving plates carried by the bucket and supported, respectively, beneath the main and drip spouts of the hopper.

2. The combination, with a bucket, of a ring embracing the same at its upper edge; and a spout having a series of superposed plates and provided with oppositely-disposed brackets connected to said ring.

3. The combination, with a reciprocatory bucket having a series of superposed stream-receiving plates, of means for delivering independent streams of material to said plates.

4. The combination, with weighing mechanism having a stop and comprehending a load-receiver and with discharging means for the latter, of an oscillatory regulator located to receive a load and to be depressed thereby and having a member operating in unison therewith which is located to engage the stop on the weighing mechanism, to thereby prolong the return movement of said weighing mechanism.

5. The combination, with weighing mechanism having a stop and comprehending a load-receiver and with discharging means for the latter, of an oscillatory regulator-hopper located to receive a load and to be depressed thereby and having a member operative in unison therewith which is located to engage the stop of the weighing mechanism, to thereby prolong the return movement of said weighing mechanism.

6. The combination, with a load-receiver and discharging means therefor, of weighing mechanism having a fixed stop; a movable regulator adapted to receive a load and be depressed thereby; and a carrier for said regulator, adapted to engage said stop on the discharge of a load, to thereby prolong the return movement of the load-receiver.

7. The combination, with weighing mechanism having a stop and comprehending a load-receiver and with discharging means for the latter, of an oscillatory regulator located to receive a load and to be depressed thereby; and a counterweighted carrier for said regulator, located to engage the stop of the weighing mechanism, to thereby retard the return movement thereof.

8. The combination, with weighing mechanism having a stop operative therewith and comprehending a load-receiver and with discharging means for the latter, of a regulator located to receive a load discharged by the weighing mechanism and to be depressed thereby; and a pivotally-supported counterweighted spider-frame the outside members of which are connected to a regulator at opposite sides thereof.

9. The combination, with weighing mechanism having a headed bolt operative therewith and comprehending a load-receiver and with discharging means for the latter, of an oscillatory regulator having a member operative therewith which has an aperture through which said headed bolt is passed.

10. The combination, with a load-receiver and with a scale-beam therefor provided with a headed bolt, of a regulator and its carrying-frame provided with an aperture through which said headed bolt is passed.

11. The combination, with weighing mechanism having a fixed stop and comprehending a load-receiver and with discharging means for the latter; of means for engaging said stop when the load is discharged, to thereby retard the return movement of the load-receiver, said last-mentioned means including an oscillatory regulator-hopper.

12. The combination, with weighing mechanism including a load-receiver having a closer, of a stud on said closer; a hooked latch carried by the load-receiver, adapted to engage said stud; a latch-tripping device; a shaft carrying two arms one of which is disposed in the path of movement of said latch-tripping device; a connector pivoted to the other arm and also to the latch; and a counterweighted actuating-arm fixed to said shaft.

13. The combination, with beam mechanism and with a bucket supported thereby having a closer, of a closer-holding latch; a rock-shaft carried by the bucket and having a latch-actuator; a crank-arm on said shaft; a rod connecting said crank-arm with the latch; and a tripping device carried by the beam mechanism, for engaging said latch-actuator to thereby operate the latch.

FRANCIS H. RICHARDS.

Witnesses:
 FRED. J. DOLE,
 HENRY BISSELL.